[19] United States Patent
Dudley

[11] 4,123,207
[45] Oct. 31, 1978

[54] UNDERWATER PELLETIZER AND HEAT EXCHANGER DIE PLATE

[75] Inventor: Vernon E. Dudley, Scott Depot, W. Va.

[73] Assignee: Gala Industries, Inc., Eagle Rock, Va.

[21] Appl. No.: 671,363

[22] Filed: Mar. 29, 1976

[51] Int. Cl.$^2$ .............................................. B29F 3/08
[52] U.S. Cl. ................................. 425/67; 425/378 R; 425/379 R
[58] Field of Search ............... 425/311, 69, 67, 313, 425/DIG. 230, 62, 378 R, 379 R

[56] References Cited

U.S. PATENT DOCUMENTS

| | | | |
|---|---|---|---|
| 3,337,913 | 8/1967 | List | 425/313 X |
| 3,452,394 | 7/1969 | McNeal | 425/379 |
| 3,477,098 | 11/1969 | Swickard et al. | 425/62 |
| 3,832,114 | 8/1974 | Yoshida | 425/313 |
| 3,912,434 | 10/1975 | Nagahara et al. | 425/313 X |

*Primary Examiner*—Richard B. Lazarus
*Attorney, Agent, or Firm*—Clarence A. O'Brien; Harvey B. Jacobson

[57] ABSTRACT

An underwater pelletizer and heat exchanger die plate combination for solidifying molten polymer entering the machine at one end and cutting the solidified fibers into small pieces or pellets. A die plate incorporating steam heated tubes allows molten plastic under high pressure to be forced therethrough into a water bath. Two or more rotating knives within the water bath rotating on the face of the die plate sever or cut up the solidified plastic into small pellets. A quick access coupling is provided for the water bath compartment and a floating ball bearing adjustment means for varying the distance between the rotating knives and the die plate is provided to permit very accurate variation of the distance between the knives and the die plate surface. An overall support frame is provided for the entire structure which is movably mounted on rollers which are also adjustable. A number of unique features are included, such as the use of welded tubes of high thermal conductivity with drilled interconnecting holes between the cylindrical steam chambers and a low thermal conductivity die face to prevent polymer freeze-off. An adjustable speed drive having the driven pulley in the middle of the shaft to provide good access to the knife adjustment means is also provided.

9 Claims, 9 Drawing Figures

4,123,207

UNDERWATER PELLETIZER AND HEAT EXCHANGER DIE PLATE

BACKGROUND OF THE INVENTION

1. Field of the Invention

This invention relates generally to devices for cutting up plastic which has been extruded and solidified into small pieces or pellets.

2. Description of the Prior Art

It is known in the field of plastic extrusion and cutting to feed plastic into a die plate for extrusion and solidification upon the exit from said die plate, and then to cut the extruded plastic into small pieces externally of said die plate. However, a known problem consists of the plastic freezing up within the die holes and either partially or completely blocking the passage of the plastic therethrough, with the resulting disruption of the entire operation.

Another common problem is accurate adjustment of the knives.

Known prior art patents which may be pertinent to this invention are as follows: U.S. Pat. Nos. 2,115,940, May 3, 1938, 2,274,432, Feb. 24, 1942, 3,452,394, July 1, 1969, 3,599,285, Aug. 17, 1971.

None of these known prior art devices offers the new and unique features of the invention disclosed herein.

SUMMARY OF THE INVENTION

An object of the present invention is to provide a heat exchanger die plate for an underwater pelletizer which will provide uniform heating around each individual extrusion tube so that the plastic will flow at the same rate through each hole and the resulting pellets will be uniform in size.

Another object of the present invention is to provide a heat exchanger die plate which will avoid freeze up of the molten plastic being extruded through the die plate so as to avoid interruption and stoppage of the overall extrusion and cutting operation.

A further object of this invention to to provide an underwater pelletizer device having portability, ease and simplicity of adjustment, and one which can be easily and quickly disassembled for replacement of worn parts.

A still further object of this invention is to provide an underwater pelletizer having a new and novel heat exchanger die plate assembly together with an adjustable cutting knife assembly and a cold water bath structure held together with a C-clamp arrangement which permits quick and simple disassembly of the bath structure for easy access to the cutting blades and the die plate.

A still further object of this invention is to provide a heat exchanger type die plate arrangement which is easily fabricated and assembled, utilizes steam to maintain the plastic being extruded in a molten state, with the structure being such that the steam is very close to the cutting surface to prevent freeze off of the plastic, and the use of high thermal conductivity extrusion tubes to prevent die plate freeze off. p Another important object of this invention is to provide a layer of low thermal conductivity metal on the cutting surface to prevent freeze up of the molten plastic. The low thermal conductivity layer is covered with tungsten carbide to provide a long wearing cutting surface.

A still further object of this invention is to provide a floating type ball bearing construction associated with the cutting knives of the underwater pelletizer to permit close and accurate adjustment of said knives without undue distortion or deflection. This permits maximum rigidity together with maximum adjustability and long bearing life.

A still further object of this invention is the unique adjustment means incorporating a single adjustment bolt for accurate and minute adjustment of the cutting knives of the underwater pelletizer in relation to the plastic extruding die plate thereof.

A still further additional object of this invention is in the adjustable speed drive for the underwater pelletizer of the present invention which permits ready access to the adjustment thereof and a unique and low cost variable speed drive.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

In the device of this invention thermal plastic resins are pelletized by an underwater pelletizer. Plastic is forced by high pressure through a large number of holes in a die plate. The holes are arranged in a circular pattern and the pellets are cut under water by two or more rotating knives. The cutting surface is lined with tungsten carbide or the like in order to provide a good wearing surface.

Figure 3:
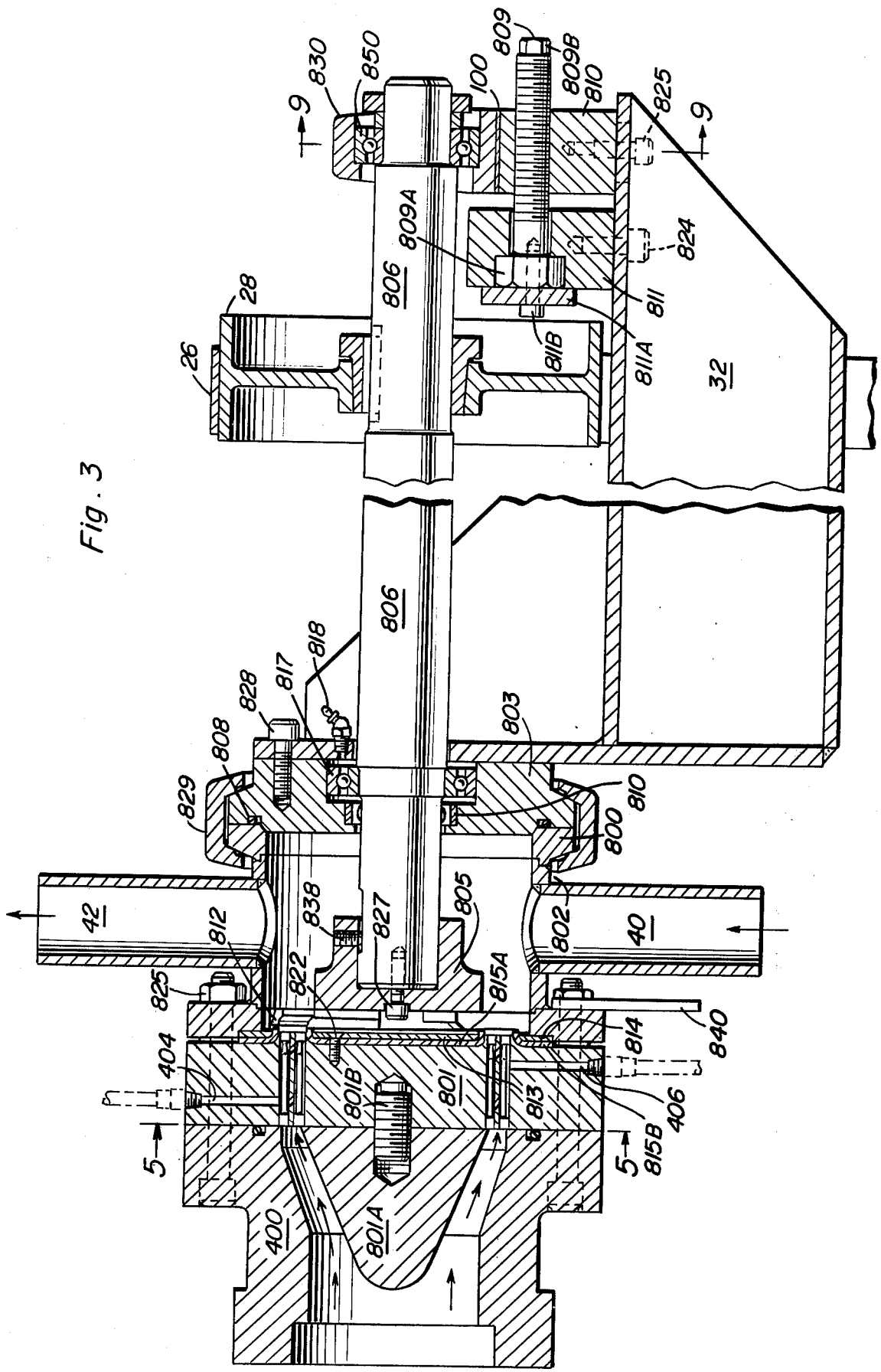
FIG. 3 is a cross-sectional view, in part, of the heat exchanger type pelletizer die plate, the water bath structure, the drive shaft with cutting blades on one end and the driving and adjustment structure on the other end.

The heat exchanger type of die plate used with this invention provides uniform heating around each individual extrusion tube so that the molten plastic will flow at the same rate through each die hole and the resulting pellets after cutting will be uniform in size. The principle of the heat exchanger type of die plate is best seen in FIG. 3, and in the large cross-section thereof of the die plate in FIG. 4.

Figure 1:
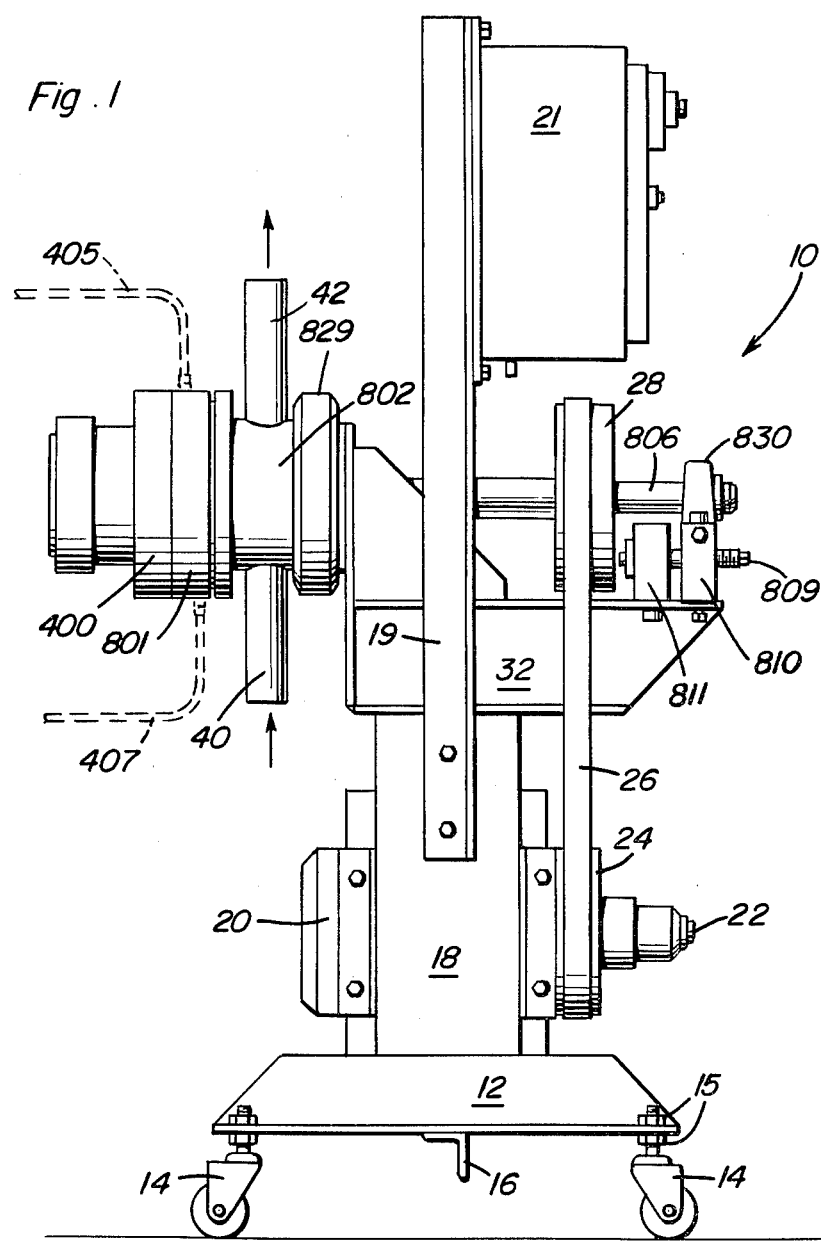
FIG. 1 is a side elevational view of the entire underwater pelletizer of this invention.

Referring to FIG. 1 of the drawings, reference numeral 10 indicates generally the underwater pelletizer of this invention. A primary base structure 12 is supported by vertically adjustable, rotatable casters 14. Lock nuts 15 on the threaded shaft of each respective caster permits adjustment thereof with respect to the support 12. Appropriate reinforcing sructure for the base support such as 16 is normally also provided.

On and upon the portable base support 12 is appropriate support structure of any desired type such as indicated generally by reference numerals 18 and 32. A drive motor 20 is also provided with an appropriate adjustable pulley structure such as 22 and 24 on the output thereof. The drive belt 26 connects with a drive pulley 28 of the pelletizer drive shaft 806. A pillow block bearing 830 supports the outer end of shaft 806 and is mounted for adjustment thereof by means of supports 810, 811, and adjusting screw 809, to be described in detail below.

A support stand 19 is also provided on the base frame for control panel 21 for providing electrical power to the motor in a well known manner.

A quick opening "C" clamp 829 provides for connecting the drive and adjustment portion of the device with the heat exchanger die plate and water bath portion. This C-clamp provides a positive, leak-tight connection between the water bath container 802 and the inner bearing support for shaft 806 which includes the structure 803, best seen in FIG. 3. The one-half of the clamp structure 803 is appropriately supported from the main frame structure 32 by means of bolts 828. The clamp 829 of the coupling positively secures and holds the portion 800 which is attached to the water bath container 802 to the structure 803 mounted on the fame. An O-ring is appropriately provided to prevent water leakage. Another water seal 810 is provided between the inner aperture of member 803 and the shaft 806. The ball bearing 817 supports the inner portion of the drive shaft 806 which securely and rigidly supports the knife cutter of 805 on the innermost end of drive shaft 806.

The water container 802 has a water inlet 40 and a water outlet 42 for supplying water to the chamber 802 to form a water bath therein appropriately indicated by W.B. Cut pellets will be swept by the water flow out the discharge path 42.

On the far left of FIG. 1, the heat exchanger die plate assembly 801 is shown as being connected to the water bath 802 and having an input portion for the molten plastic 400 connected thereto. Appropriate steam lines 405 and 407 are indicated for supplying and exhausting steam to and from the heat exchanger die plate assembly 801.

Figure 4:
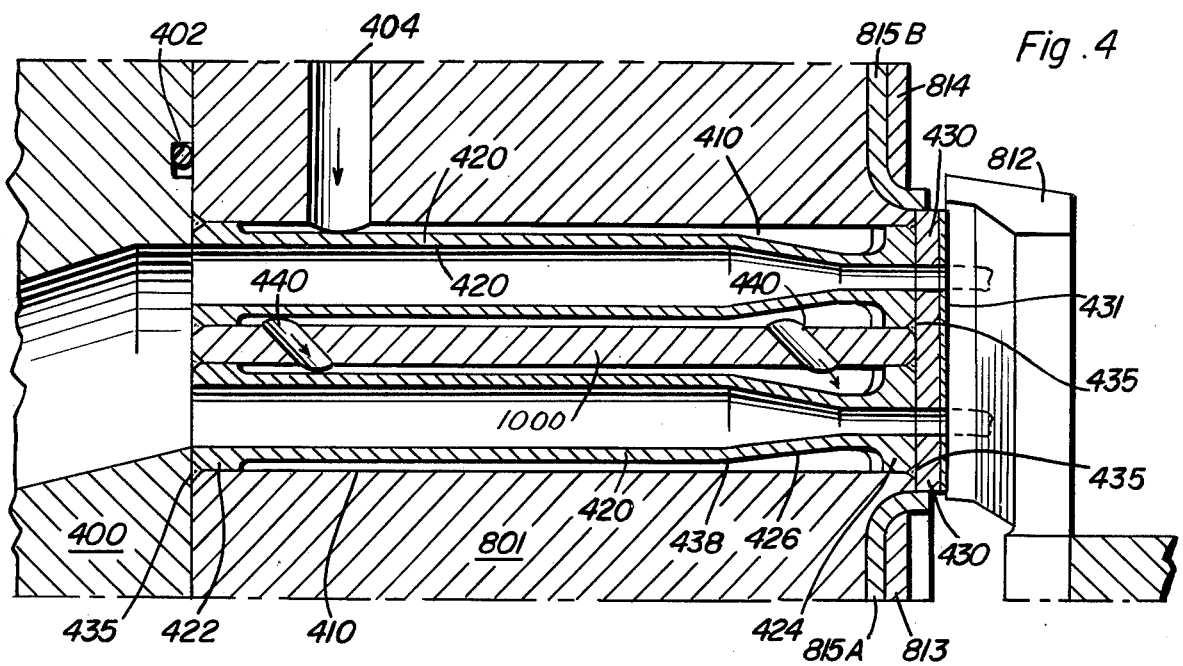
FIG. 4 is an enlarged cross-section, in part, of the die plate of the heat exchanger type as used with this invention.
Figure 5:
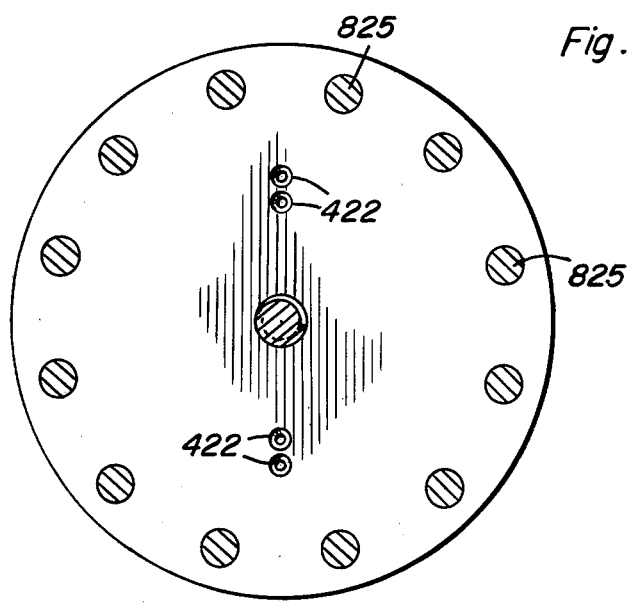
FIG. 5 is an end view of the die plate taken generally along line 5—5 of FIG. 3.

Looking at FIGS. 3 and 4, the heat exchanger die plate assembly of this invention will be described. The input structure for the molten plastic 400 is appropriately attached to the die plate assembly 801 by means of a plurality of circumferentially spaced nuts and bolts 825. Mounted on the center portion of the heat exchange die plate 801 is a cone assembly 801A removably attached thereto by screw 801B.

Looking at FIG. 4, the new and novel tube-type die plate will be described. Passageways 410 are appropriately drilled within the die plate structure 801 of accurate predetermined size. Inserted into these drilled holes are heat exchanger tubes 420 of Inconel 600, stainless steel or like material which have been pre-formed with enlarged portions 422, 424 and recesses 426. These tubes are inserted into the pre-drilled apertures 410 and welded at the ends thereof as indicated by 435. It has been discovered that the die functions better if tubes are made of high thermal conductivity metal.

Steam passageways 440 are also provided within portions 1000 of the die plate 801 and are an important part of this invention because it permits an ease of fabrication not available in other die plates. It should be pointed out that the use of the tubes 420 provide uniform heating of the plastic passing therethrough. The unique construction of this device includes the drilled holes 410, steam entering passageway 404 to be equally distributed around the outside of the tubes 420, and the flow through the passageways 440 to the exit passageway 406 and to exhaust line 407. The tubes are of a novel shape to provide ease of manufacture and sufficient space for steam at the critical exit point of the die. Duranickel is an austenitic material with good thermal conductivity. Normally, the Heliarc welding process will be used to join the members of the assembly, all of the welded members being of austenitic material.

A layer of low thermal conductivity metal 430 is provided between the die plate and the water bath to prevent freeze-off of this die plate. The low thermal conductivity layer is coated with tungsten carbide for a hard wearing surface 431. The die plate is also insulated from heat loss by glass filled telfon gaskets 815A and B. The insulation is protected by holding plates 814 and 813 held with set screws 822.

Referring to FIG. 3 of the drawings, molten polymer enters 400 of the pelletizer under pressure and flows by the nose cone 801A as shown by the flow arrows into the holes in the die plate 801. The polymer is in a molten condition as it enters the die plate and flows through the tubes and in the die plate. As the polymer emerges into the water bath W.B., the strands are cut into small pellets by the rotating knives 812, to be described in detail below. The pellets are cooled and transported out of the pelletizer by water flowing through the water box 802.

Figure 2:
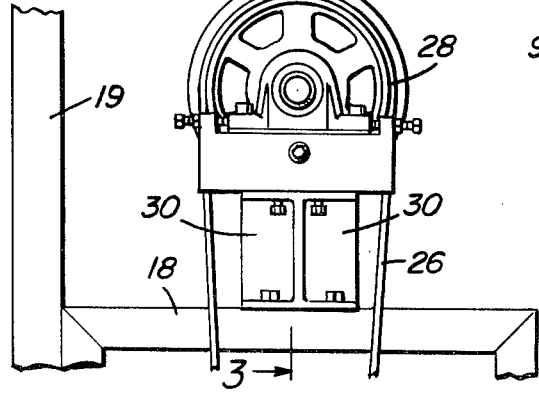
FIG. 2 is a cross-sectional view, in part, of the end of the underwater pelletizer through the middle thereof looking from the right side thereof.

The shaft 806 is driven by a variable speed drive shown in FIGS. 1, 2 and 3 of the drawings. The blades 812 are adjusted to the proper clearance just short of contact with the die plate by the adjustment bolt 809. The stationary block 811 is bolted in place by two bolts 824. Sliding block 810 supports the bearing 850 and moves to position the blades 812.

Figure 9:
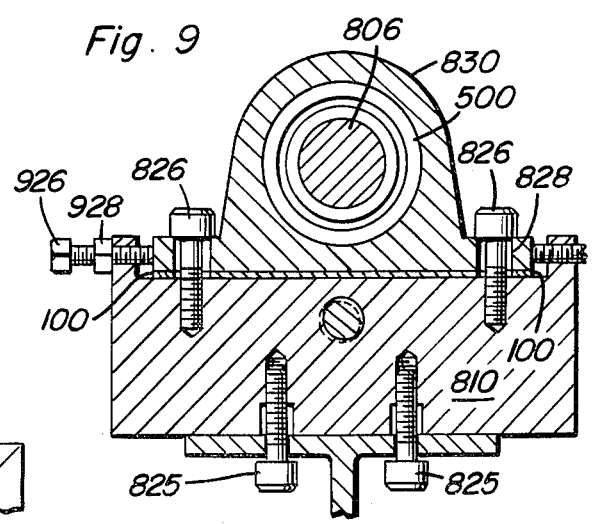
FIG. 9 is a cross-sectional view of the bearing support and adjustment structure taken generally along line 9—9 of FIG. 3.

Alignment is made by adding or subtracting shims 100 under the bearing holder 830, or by adjusting the bearings from side to side by adjustment bolts 926 and lock nuts 928 (FIG. 9). The apertures 828 in the holder 830 are slightly larger in size than the bolts 826 to permit sidewise adjustment.

The C-clamp 829 secures the rotating drive assembly to the stationary die and water bath assembly. Adjustable casters 14, 15 support the complete device. The C-clamp 829 is a quick opening device that permits ready access to the water box 802, for inspection, maintenance, changing of the knife blades, etc.

The nose cone 801A is removable by set screws 801B. By removing the nose cone the die plate can be placed on a machine for reservicing or regrinding the cutting surface.

Figure 6:
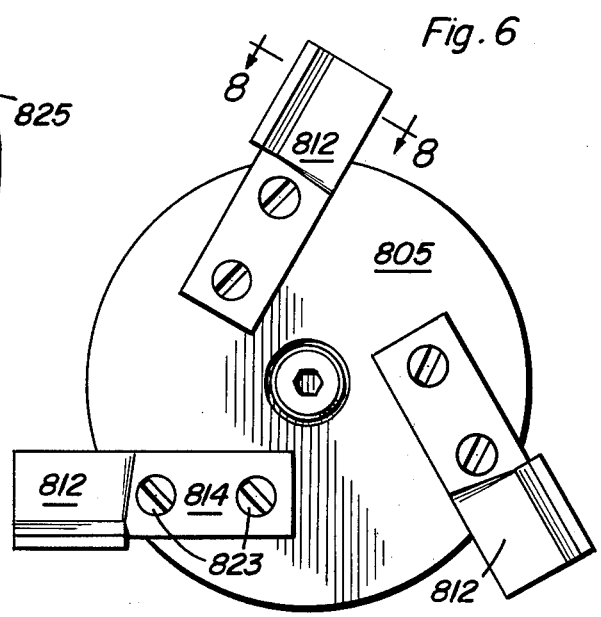
FIG. 6 is an end view of the cutter blades and hub assembly of FIGS. 3 and 4.
Figure 7:
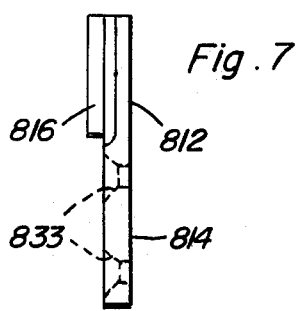
FIG. 7 is a side elevational view of one of the cutter blades per se.
Figure 8:
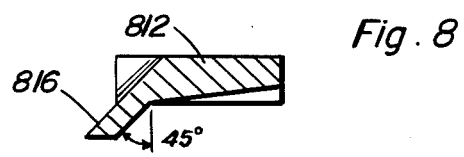
FIG. 8 is an end view of the cutting edge of one of the cutter blades.

FIGS. 3 and 6 show the cutting knife hub 805 which is appropriately mounted on the end of the drive shaft 806 by bolts 827 and set screw 838. Mounted upon the face of the knife hub 805 at an angle of approximately 30 degress from the radial are two or more knives 812. These knives are made of tungstein carbide steel or other appropriate material and have a unique cutting surface and shape 816 as best seen in FIGS. 7 and 8 of the drawings. Screws 823, fitting in recessed apertures 833 in the body 814, fasten the knives to the hub 805. FIG. 8 shows the 45 degree angle the cutting edge makes with the die plate surface.

Looking at FIG. 3, the drive shaft support and adjustment end at the right thereof is shown. The drive pulley 28 which is driven by the belt 26 from the drive motor is keyed or splined to the shaft 806 by conventional means. The outer end of the drive shaft 806 is supported by a ball or roller bearing 850 mounted within the pillow block 820. The pillow block 830 is appropriately mounted upon the adjusting block 810 by screws 826. Shims 100 are provided between the block 830 and the support 810 with the apertures at either side of the pillow block for receiving the screws 826 being slightly larger than said screws to permit slight adjustment of said pillow block in a horizontal direction once said screws are loosened. Screws 825 retain the adjustable block 810 on the main support structure 32. Block 811 is firmly secured to the structure 32 by other screws 824. A cover plate 811A retained and fastened to the block 811 by screws 811B holds the adjusting screw 809 within the block 811 but rotatably therewithin. As can be visualized with the head 809A of the adjusting screw 809 being secured against horizontal movement by the secured block 811, if the screw 809 is rotated by means of the wrench engaging portiom 809B, a fine degree of movement and adjustment of block 810 will occur. This adjustment of screw 809 will minutely and accurately move the drive shaft 806 in a longitudinal direction to permit a fine degree of adjustment of the cutter knives 812 with respect to the die plate surface 430, as best seen in FIG. 4.

The construction of the tube type heat exchanger with drilled interconnecting holes for steam heating is unique. These holes shown in die plate 801 are drilled straight through to receive the special shaped tubes which are Heliarc welded in place. The die plate is made of stainless steel. The tubes fabricated of an alloy with a high thermal conductivity to prevent freeze off of the polymer. Steam passes to the tube holes by interconnect holes drilled or machined from the front and back face of the die plate. The primary advantages of this design are (a) ease in fabrication by drilling and Heliarc welding, (b) the steam is very close to the cutting surface to prevent freeze off, and (c) use of high thermal conductivity tubes and a low thermal conductivity layer to prevent freeze off.

The C-clamp 829, arrangement provides quick removal of the entire rotating assembly for changing of knife blades or die plate.

The floating-type ball bearing, 817, slides back and forth in the water box seal flange, 803, for knife adjustment. This unique bearing arrangement provides a heavy duty lubricated ball or roller bearing near the cutter hub 805 for maximum rigidity. In other designs, this has been accomplished by a sleeve bearing which is not as rugged as the ball bearing. The ball bearing is pressed onto the shaft 806.

The knife 812, cutting surface 431, gap is asjusted by turning the adjustment bolt 809. This arrangement is a unique, low-cost method.

An adjustable speed drive is located on the middle of the shaft to make the adjustment bolt 809 readily accessible at the end of the pelletizer. This unique design permits the addition of a tachometer to the end of the drive shaft 806. Further, the shaft can be drilled for more advantageous supply of cooling water to sweep pellets away from the cutting surface. This arrangement also provides a rigid cutting assembly provided by the physical distance between the supporting bearings compared to the distance between the sliding bearing 817 and the cutter hub 805.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In an underwater pelletizer apparatus for extruding molten material into a water bath to solidify the material, the improvement comprising:

a solid die plate of substantial mass and having a plurality of spaced channels formed longitudinally therethrough, the channels extending completely through said die plate, solid portions of the die plate lying between the channels and defining walls of the channels, said solid portions being substantially continuous between adjacent channels, the die plate further having a plurality of passageways formed in said solid portions interconnecting the spaced channels;

a tubular member disposed within each of the spaced channels, the outer walls of each of the tubular members being spaced at least over central portions thereof from the walls of the channel in which said tubular member is disposed, each tubular member having a longitudinal opening formed therein, the opening communicating at a first end of the member with the water bath, the first end of each tubular member having a first enlarged portion which is contiguous about perimetric portions thereof to portions of the walls of said channel at the end of said channel adjacent said first end of said tubular member, each tubular member further having a second enlarged portion of the other end thereof contiguous to the walls of said channel at the end of said channel opposite said first end of said tubular member:

steam inlet means for directing a relatively heated fluent material into the portions of the spaced channels between the walls of said channels and the outer walls of the tubular members disposed therein, and through the passageways formed in the solid portions of the die plate to exchange heat with the tubular members and body portion of the die plate including said solid portions lying between the channels and defining the walls thereof;

steam outlet means for directing the heated fluent material from the spaced channels;

means for directing the molten material into and through the openings in the tubular members into the water bath; and, means for cutting the now-solidified molten material entering the water bath into substantially uniformally sized pellets, the molten material being maintained in a molten state throughout passage thereof through the tubular members due to heat exchange through walls of the tubular members including the first-mentioned enlarged portions thereof proximous to the water bath, the die plate including the solid portions lying between the channels and defining the walls thereof and the enlarged portions of the tubular members acting as means to retain heat for exchange with the molten material in heat sink fashion, and particularly to retain heat for transfer to the molten material at the first ends of the tubular members proximous to the water bath to present solidification of said molten material prior to entry thereof into the water bath.

2. In the apparatus of claim 1, the tubular members being reduced in diameter at portions thereof adjacent to the first enlarged portions thereof, the portions of the spaced channels lying between the outer walls of the tubular members and the walls of the channels at said reduced portions of the tubular members being volumetrically enlarged relative to the remaining portions of said portions of said spaced apertures, thereby to increase the mass of heated fluent material in heat exchange relation to said first ends of said tubular members proximous to the water bath to prevent solidification of the molten material prior to exit from said tubular members into said water bath.

3. In the apparatus of claim 2, the openings in the tubular members being reduced in diameter at the first ends of said tubular members.

4. In the apparatus of claim 2 wherein at least one of the passageways formed in the solid portions of the die plate communicates directly with at least one of the volumetrically enlarged portions of the spaced channels lying between the outer walls of the tubular members and the walls of the channels.

5. In the apparatus of claim 1, the cutting means comprising a cutter head rotatably mounted in opposing relation to the openings in the tubular members at the loci of exit of the molten material therefrom into the water bath, said head having at least two knife blades mounted thereon for severing the solidified portion of said material in the water bath from the still-molten material exiting the tubular members to produce pellets of substantially uniform size.

6. In the apparatus of claim 1, the improvement further comprising means for adjusting the relative position of the die plate and the cutting means.

7. In the apparatus of claim 6, the adjusting means comprising:
    a shaft mounting the cutter means at one end thereof, the shaft being mounted for rotation in the water bath; and,
    an adjustable mount mounting the other end of the shaft externally of the water bath, thereby permitting longitudinal adjustment of the shaft.

8. In the apparatus of claim 1, wherein the tubular members are formed of an alloy material having high thermal conductivity to assist in uniform heating of the tubular members and the molten material therein.

9. In the apparatus of claim 1 and further comprising a layer of low thermal conductivity material and a coating of tungsten carbide disposed on that portion of the die plate opposing the water bath, and a layer of insulative material disposed adjacent said coating for insulating the die plate from the water bath.

* * * * *